United States Patent
Smithanik et al.

(10) Patent No.: US 8,269,388 B2
(45) Date of Patent: Sep. 18, 2012

(54) MAGNETIC BEARING ASSEMBLY FOR ROTORS

(75) Inventors: Jeffrey Russell Smithanik, Calgary (CA); Tracy Kathryn Strem, Calgary (CA); Daren Paul Tremaine, Silverton (CA)

(73) Assignee: Aktiebolaget SKF, Göteborg (CH)

( * ) Notice: Subject to any disclaimer, the term of this patent is extended or adjusted under 35 U.S.C. 154(b) by 747 days.

(21) Appl. No.: 12/322,424

(22) Filed: Feb. 2, 2009

(65) Prior Publication Data

US 2010/0194224 A1 Aug. 5, 2010

(51) Int. Cl.
*H02K 7/09* (2006.01)
(52) U.S. Cl. ..................... 310/90.5
(58) Field of Classification Search .............. 310/90.5, 310/68 B
See application file for complete search history.

(56) References Cited

U.S. PATENT DOCUMENTS

| | | | |
|---|---|---|---|
| 5,010,563 A * | 4/1991 | Laurent et al. | 378/132 |
| 5,196,748 A | 3/1993 | Rigney | |
| 5,268,955 A | 12/1993 | Burke et al. | |
| 5,548,629 A | 8/1996 | Kimura et al. | |
| 6,563,244 B1 | 5/2003 | Yamauchi et al. | |
| 6,727,617 B2 * | 4/2004 | McMullen et al. | 310/90.5 |
| 7,240,515 B2 | 7/2007 | Conry | |
| 7,800,268 B2 | 9/2010 | Sun et al. | |
| 2007/0153977 A1 | 7/2007 | Yokoyama et al. | |
| 2008/0246373 A1* | 10/2008 | Filatov | 310/68 B |
| 2009/0201111 A1 | 8/2009 | Filatov | |
| 2011/0158382 A1 | 6/2011 | Sahin Nomaler et al. | |

* cited by examiner

*Primary Examiner* — Quyen Leung
*Assistant Examiner* — David Scheuermann
(74) *Attorney, Agent, or Firm* — Mark A. Ussai

(57) ABSTRACT

A rotor assembly includes a rotor having a central axis extending between the two opposing ends and a radial surface, and is rotatable about the central axis. At least one electromagnet is disposed proximal to and configured to exert magnetic force on a portion of the rotor. Further, a channeling member is disposed generally adjacent to the electromagnet and has a radial surface disposed adjacent to the rotor radial surface. As such, magnetic flux generated by the electromagnet extends generally radially between the electromagnet and the rotor portion and generally axially between the rotor portion and the channeling member so that the magnetic force biases the rotor both radially and axially to maintain the rotor at a desired position. Preferably, the assembly includes a plurality of magnets proximal to each end, two channeling members, and a tubular body extending between the channeling members and enclosing the rotor.

25 Claims, 8 Drawing Sheets

MAGNETIC BEARING ASSEMBLY FOR ROTORS

The present invention relates to rotor assemblies, and more particularly to rotor assemblies supported by magnetic bearings.

Magnetic bearing assemblies for supporting rotors, such as the shaft of a compressor, X-ray anode shafts, etc., are generally known and typically include one or more electromagnets for exerting a force on the shaft. The electromagnet(s) may radially support or suspend the shaft, support radial or axial loading, and/or maintain the radial or axial position thereof, either as a primary bearing or as an auxiliary or back-up to another type of bearing (e.g., rolling element bearing, plain bearing, gas face, etc.). Typically, a magnetic bearing actuator only supports one type of loading, i.e., either radial or axial, such that a combination of different types of magnetic bearing actuators is generally required when both types of loading are a concern.

SUMMARY OF THE INVENTION

In one aspect, the present invention is a rotor assembly comprising a rotor having opposing first and second ends, a central axis extending generally between the two ends and generally parallel to a reference axis, and an at least generally radial surface, the rotor being rotatable about the central axis. At least one electromagnet is disposed proximal to and configured to exert magnetic force on a portion of the rotor. Further, a channeling member is disposed generally against the electromagnet and has a radial surface disposed generally adjacent to the rotor radial surface. As such, magnetic flux generated by the electromagnet extends generally radially between the electromagnet and the rotor portion and generally axially between the rotor portion and the channeling member so that the magnetic force biases the rotor both radially and axially with respect to the reference axis to maintain the rotor generally centered about the reference axis.

In another aspect, the present invention is a magnetic bearing assembly for a rotor assembly including a rotor having opposing first and second ends, a central axis extending generally between the two ends and generally parallel to a reference axis, and a radial surface, the rotor being rotatable about the central axis. The magnetic bearing assembly comprises at least one electromagnet disposed proximal to and configured to exert magnetic force on a portion of the rotor and a channeling member. The channeling member is disposed generally against the electromagnet and has a radial surface disposed generally adjacent to the rotor radial surface. As such, magnetic flux generated by the electromagnet extends generally radially between the electromagnet and the rotor portion and generally axially between the rotor portion and the channeling member so that the magnetic force biases the rotor both radially and axially with respect to the reference axis to maintain the rotor generally centered about the reference axis.

In a further aspect, the present invention is a rotor assembly comprising a rotor having opposing first and second ends, a central axis extending generally between the two ends and generally parallel to a reference axis, and first and second radial surfaces, the rotor being rotatable about the central axis. First and second electromagnets are spaced apart along the reference axis, the first electromagnet being disposed proximal to and is configured to exert magnetic force on a first portion of the rotor so as to bias the rotor first portion radially and axially with respect to the reference axis. The second electromagnet is disposed proximal to and is configured to exert magnetic force on a second portion of the rotor so as to bias the rotor second portion both radially and axially with respect to the reference axis. Further, first and second generally annular channeling members are spaced apart along the reference axis, the first channeling member being disposed generally against the first electromagnet and has a radial surface disposed generally adjacent to the rotor first radial surface and the second channeling member is disposed generally against the second electromagnet and has a radial surface disposed generally adjacent to the rotor second radial surface. Furthermore, a generally cylindrical tubular housing has a first end disposed against the first channeling member and a second end disposed against the second channeling member, the housing and the channeling members defining a chamber, at least a portion of the rotor being disposed within the chamber.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
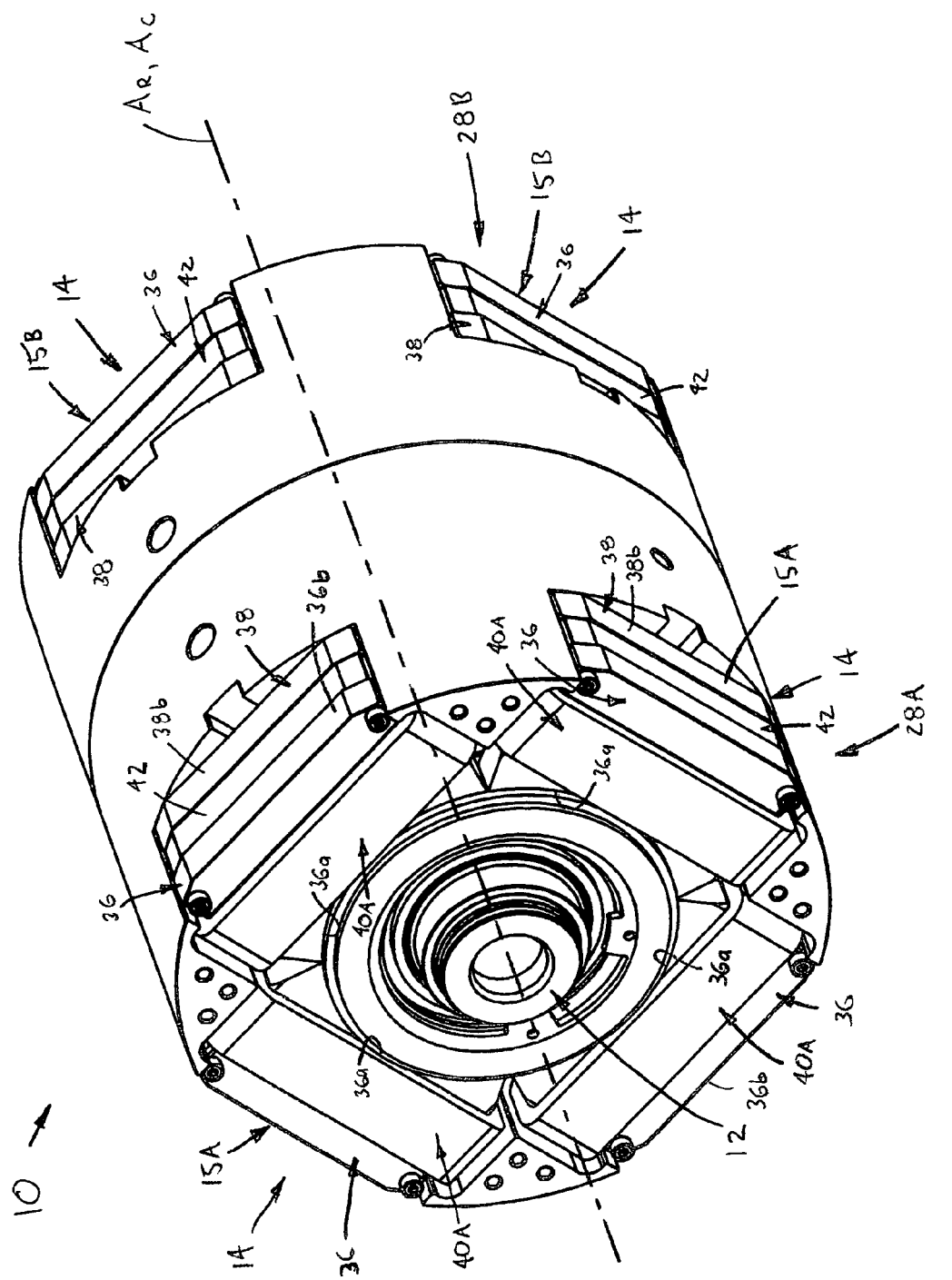
FIG. 1 is perspective view of a rotor assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. As used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a rotor assembly 10, which in one embodiment is incorporated into an X-ray anode assembly 1 of an X-ray machine XM, as described below. The rotor assembly 10 basically comprises a rotor 12, a magnetic bearing assembly 11 including at least one and preferably a plurality of electromagnets 14, and at least one and preferably two channeling members 16. The rotor 12 has opposing first and second ends 12a, 12b, a central axis $A_C$ extending generally between the two ends 12a, 12b and generally parallel to a reference axis $A_R$, and one or more generally radially-extending or "radial" surfaces 20, preferably first and second axially-spaced radial surfaces 21A, 21B facing in opposing axial directions. The rotor 12 is rotatable about the central axis $A_C$, which is preferably maintained substantially parallel with the reference axis $A_R$, such that the axes $A_C$, $A_R$ are either collinear or radially offset, but the axes $A_C$, $A_R$ may alternatively be skewed or intersecting. The at least one electromagnet 14 is disposed proximal to and is configured to exert a magnetic force $f_{mn}$ on a generally proximal portion 22 of the rotor 12.

Figure 2:
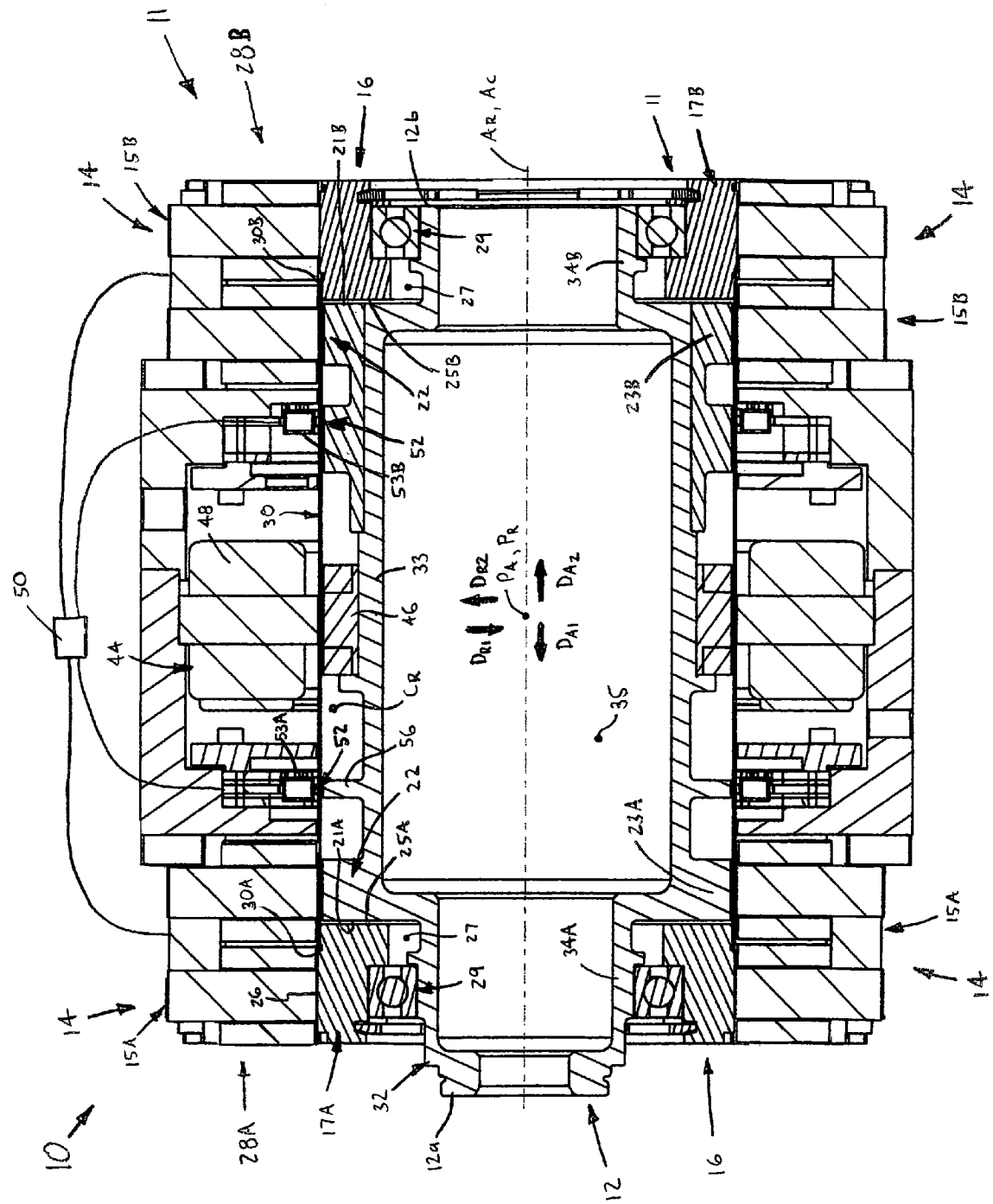
FIG. 2 is an axial cross-sectional view through the rotor assembly.
Figure 3:
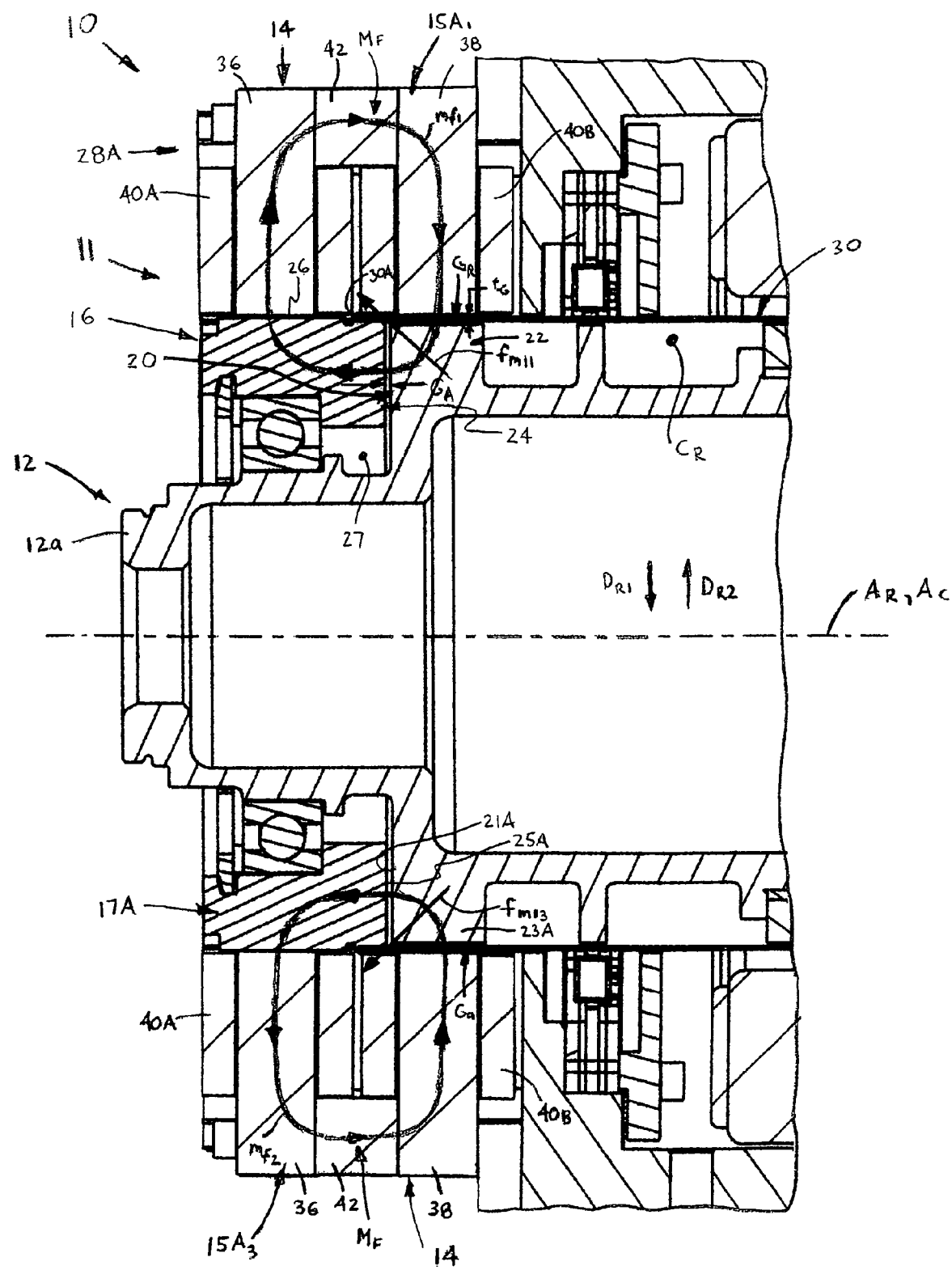
FIG. 3 is a greatly enlarged view of a front portion of FIG. 2.

Further, each of the one or two channeling members 16 is disposed generally against at least one electromagnet 14 and has an at least generally radial surface 24 disposed generally adjacent to a proximal rotor radial surface 20, and preferably spaced a relatively short axial distance from the surface 20 so as to define an "axial" gap $G_A$ (see FIG. 3). Preferably, the radial surfaces 20, 24 of the rotor 12 and the channeling member(s) 16, respectively, are substantially radial or radially-extending as depicted in FIGS. 1-6 and 8. However, the rotor 12 and the channeling member(s) 16 may alternatively be constructed such that the surfaces 20, 24 are each also partly axially-extending, and thus only "generally" radially-extending or radial, as depicted in FIG. 7.

With this structure, the magnetic flux $M_F$ generated by each of the one or more electromagnets 14 extends generally radially between the electromagnet 14 and the proximal rotor portion 22 and generally axially between the rotor portion 22 and the proximal channeling member 16. As such, the magnetic force $f_{mn}$ generated by each electromagnet 14 biases the rotor 12 both radially and axially with respect to the reference axis $A_R$, with all of the electromagnets 14 being preferably arranged to maintain the rotor 12 generally centered about the reference axis $A_R$, i.e., so that the axes $A_R$, $A_C$ are substantially parallel and either collinear or radially offset (or even skewed/intersecting), and at about a desired axial position $P_A$ (FIG. 2) with respect to the reference axis $A_R$. Thus, when operated by a control 50, as described below, the one or more electromagnet(s) 14 provide a magnetic bearing assembly 11 that maintains the rotor 12 at a specific, desired axial and radial position $P_A$ on the reference axis $A_R$, and preferably also supports or "levitates" the rotor 12 at the desired position $P_A$.

Figure 4:
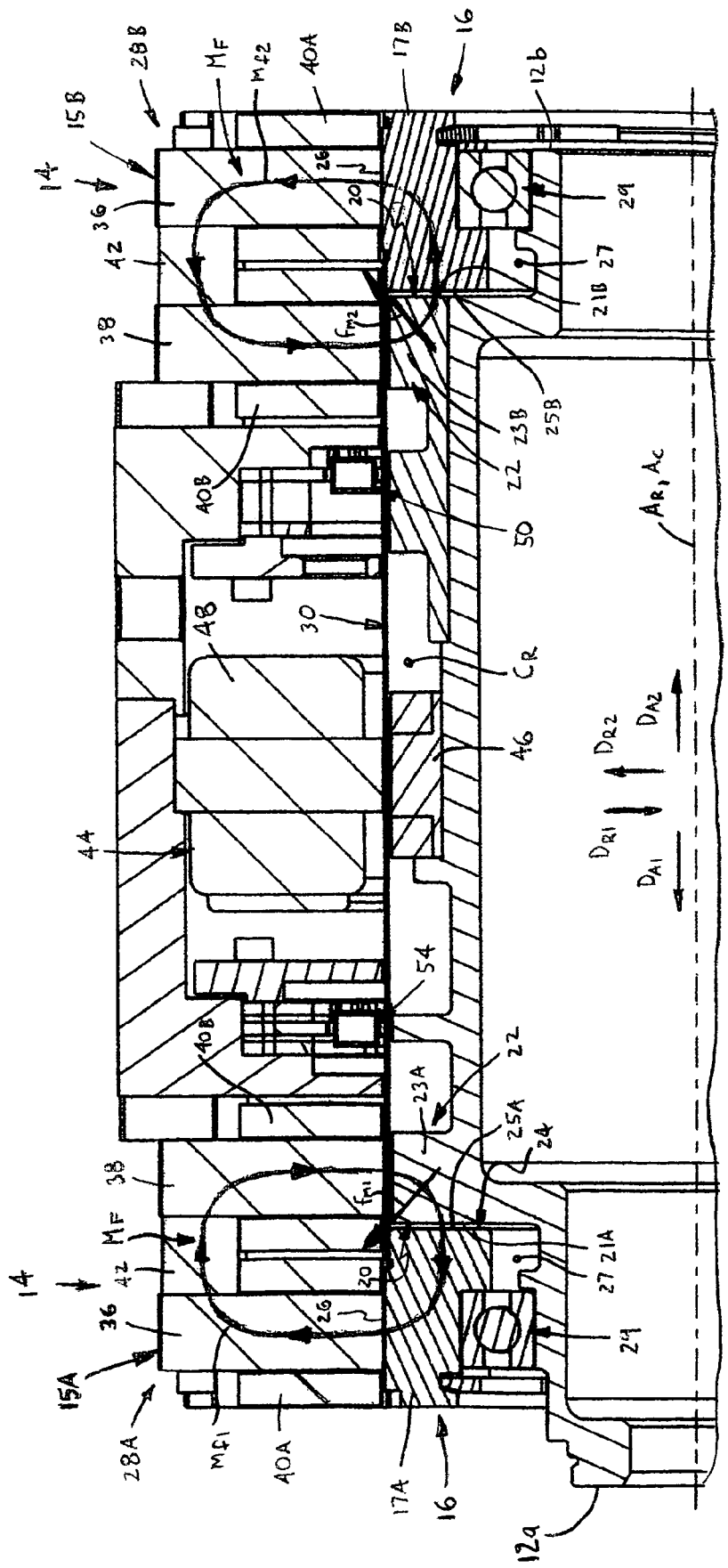
FIG. 4 is an enlarged view of an upper portion of FIG. 2.

Referring now to FIGS. 2 and 4, the rotor assembly 10 preferably includes first and second electromagnets 15A, 15B, respectively, spaced apart along the reference axis $R_A$ and first and 30 second channeling members 17A, 17B, respectively, also spaced apart along the axis $R_A$. By having at least two spaced-apart electromagnets 15A, 15B, the electromagnets 14 of the rotor assembly 10 are capable of biasing the rotor 12 in opposing directions $D_{A1}$, $D_{A2}$ along the reference axis $A_R$, as described below. More specifically, one or more first electromagnets 15A are each disposed proximal to and configured to exert magnetic force $f_{M1}$ on a first portion 23A of the rotor 14, and are located at least generally proximal to the rotor first end 12a. Further, one or more second electromagnets 15B are each disposed proximal to and configured to exert magnetic force $f_{M2}$ on a second portion 23B of the rotor 12, and are located at least generally proximal to the rotor second end 12b. Further, the first channeling member 17A is disposed generally against (i.e., either in contact with or separated by a minimal clearance) the one or more first or second electromagnets 15A and has a generally radial surface 25A disposed generally adjacent to, and preferably spaced a short axial distance from, a rotor first radial surface 21A. In a similar manner, the second channeling member 17B is disposed generally against the one or more second electromagnets 15B and has a generally radial surface 25B disposed generally adjacent to (and preferably slightly axially spaced from) a rotor second radial surface 21B.

Referring particularly to FIG. 4, with the above-described structure, magnetic flux $m_{f1}$ generated by each first electromagnet 15A extends generally radially between the electromagnet 15A and the rotor first portion 23A and generally axially between the rotor first portion 23A and the first channeling member 17A. Also, magnetic flux $m_{f2}$ generated by each second electromagnet 15B extends generally radially between the second electromagnet 15B and the rotor second portion 23B and generally axially between the rotor second portion 23B and the second channeling member 17B.

Preferably, electric current is adjustably supplied to each of the first and second electromagnets 15A, 15B, as determined by the control 50 as described below, such that the magnetic flux $m_{F1}$, $m_{F2}$ of each electromagnet 15A, 15B extends or "flows" between the associated rotor portion 21A, 21B and the channeling member 17A, 17B so as to exert the magnetic forces $f_{M1}$, $f_{M2}$ in opposing axial directions $D_{A1}$, $D_{A2}$, as shown in FIG. 4. As is known to those skilled in the art of electromagnets, the magnitude of the force $f_{mn}$ exerted by each electromagnet 14 on the rotor 12 is as determined by the magnitude of the current through the particular electromagnet 14 and the distance between the rotor 12 and the electromagnet 14. Thus, when the magnitude of the force $f_{m1}$, $f_{m2}$ exerted by the one or more electromagnets 15A, 15B is approximately equal, the forces $f_{m1}$, $f_{m2}$ are offsetting (i.e., cancelling due to opposing directions) when the electromagnets 14 are "radially balanced" as described below, such that the rotor 12 is retained at a particular position on the reference axis $A_R$. However, when the control 50 determines that the rotor 12 should be displaced along the axis $A_R$ so as to be repositioned at a desired axial position/location, the control 50 adjusts the current in either the first or second electromagnets 15A, 15B such that a net axial force is exerted on the rotor 12 to displace the rotor 12 in a desired axial direction $D_{A1}$ or $D_{A2}$.

Although preferably including first and second axially spaced electromagnets 15A, 15B, most preferably two sets 28A, 28B thereof as described below, the rotor assembly 10 may alternatively include one or more electromagnets 14 at a single axial location and which exert magnetic force only on one portion 22 of the rotor 12, in which case the rotor assembly 10 would only include a single channeling member 16. Such an alternative rotor assembly 10 may also include another mechanical or electrical biasing means, such as one or more springs, permanent magnets, etc., to provide a counteracting bias or may function solely with the one or more electromagnets at the single location.

Figure 5:
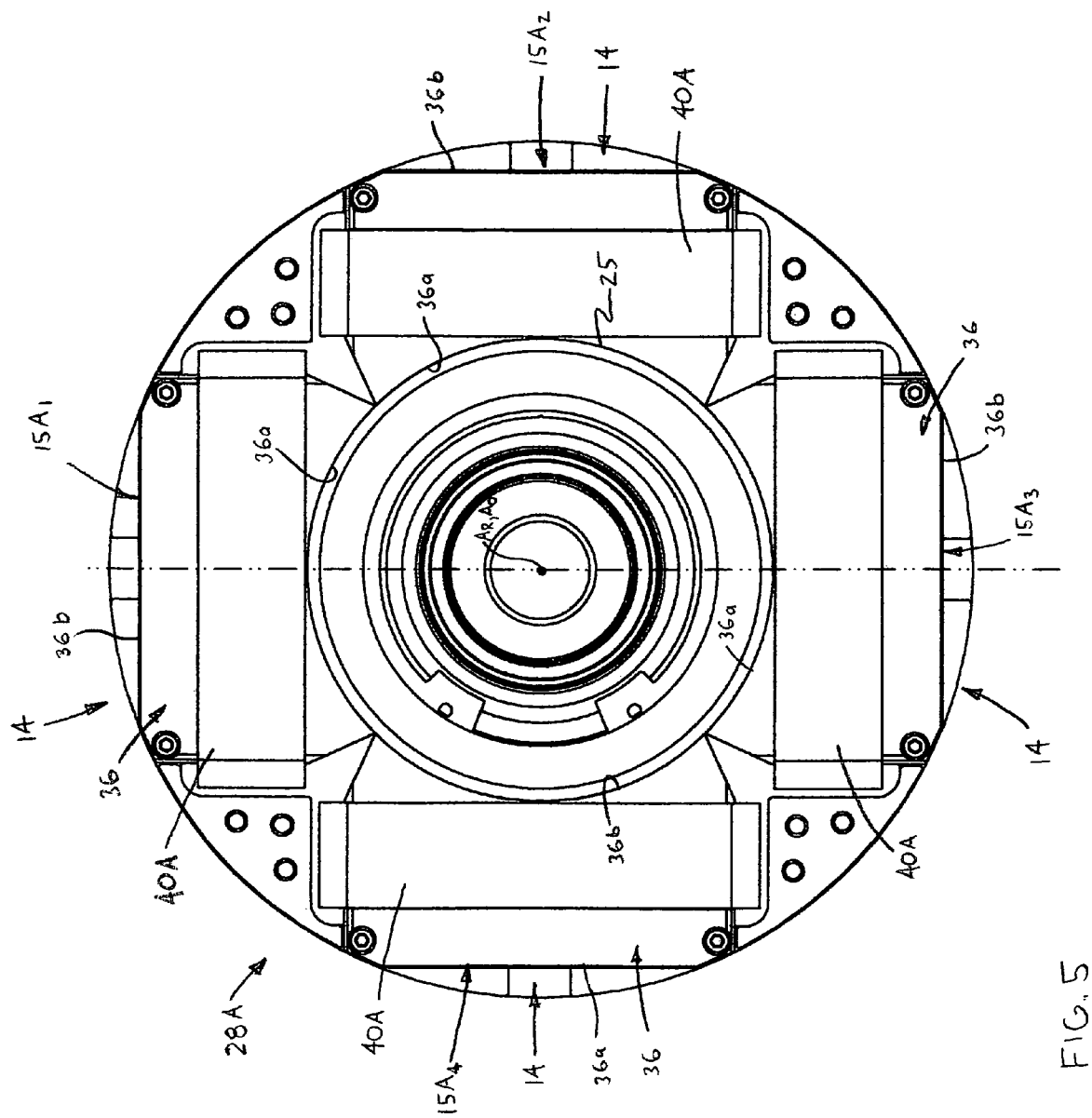
FIG. 5 is a front plan view the rotor assembly.

Referring to FIGS. 1-5, the rotor assembly 10 preferably includes a first set 28A of the first electromagnets 15A and a second set 28B of the second electromagnets 15A, 15B. Each electromagnet set 28A, 28B includes a plurality of electromagnets 15A, 15B, respectively, spaced circumferentially about the reference axis $A_R$. As such, each rotor portion 21A, 21B is "radially balanced" when both the current in each electromagnet 15A, 15B is substantially equal and the spacing between each rotor portion 21A, 21B and each electromagnet 15A or 15B of the associated set 28A, 28B is substantially equal. Preferably, each electromagnet set 28A, 28B includes four electromagnets 14, such that the rotor assembly 10 includes a total of eight electromagnets 14. More specifically, the first electromagnet set 28A preferably includes four electromagnets $15A_1$, $15A_2$, $15A_3$, and $15A_4$ spaced apart in at least generally equal angular increments about the reference axis $A_R$, as indicated in FIG. 5, and the second electromagnet set 28A includes four similarly arranged electromagnets 15B. Further, each one of the plurality of electromagnets 15A, 15B of each electromagnet set 28A, 28B is configured to exert magnetic force $f_{M1n}$, $f_{M2n}$, on the associated rotor portion 23A, 23B, specifically on a section of the particular rotor portion 23A, 23B that is proximal to the particular electromagnet 15A, 15B at any moment during angular rotation of the rotor 12, as indicated in FIG. 3 for the first electromagnets $15A_1$ and $15A_3$.

Furthermore, the first and second channeling members 17A, 17B are preferably each disposed generally against (i.e., in contact with or separated by clearance) each one of the plurality of electromagnets 15A, 15B of the associated set of magnets 28A, 28B, respectively. More specifically, each channeling member 17A, 17B is preferably generally annular and has an outer circumferential surface 26 and a central bore 27, and may be formed as a one-piece body (i.e., a ring) or an assembly of connected-together, generally arcuate segments. The channeling members 17A, 17B are each spaced radially inwardly from the associated electromagnets 15A, 15B such that each of the plurality of electromagnets 15A, 15B of the associated electromagnet set 28A, 28B is disposed against the channeling member outer circumferential surface 26. Preferably, with annular channeling members 17A, 17B, the rotor 12 extends at least partially through each channeling member bore 27 and also through a separate auxiliary bearing 29 disposed in each channeling member 17A, 17B.

More specifically, each auxiliary bearing 29 is preferably disposed within the bore 27 of a separate one of the two channeling members 17A, 17B, such that the channeling members 17A, 17B each further function as a housing for the associated auxiliary bearing 29. Further, the auxiliary bearings 29 are each disposed about, and spaced radially outwardly from, a separate section of the rotor 12, such that the rotor 12 generally rotates within the static bearings 29 during normal operation of the rotor assembly 10. Preferably, each auxiliary bearing 29 is a rolling element bearing, but may alternatively be a plain bearing and/or the bearings 29 may be disposed at any other locations on the rotor 12 (i.e., externally of the channeling members 17A, 17B).

Referring particularly to FIG. 3, with one or more sets 28A, 28B of circumferentially-spaced electromagnets 14 as discussed above, when the magnitude of the radial component of the force generated by current through all of the electromagnets 15A or 15B of a particular set 28A, 28B, respectively, is approximately equal, the radial component of the force $f_{m1n}$ or $f_{m2n}$ generated by each electromagnet 14 is radially balancing or offsetting, such that the rotor 12 is retained at a particular radial position on the reference axis $A_R$. In other words, although subjected to separate or discrete forces $f_{m1n}$ or $f_{m2n}$ exerted by a plurality of electromagnets 14, the rotor 12 is maintained at a particular radial position (i.e., centered on or offset from the axis $A_R$) when the magnitude of the radial component of each force $f_{m1n}$ or $f_{m2n}$ is generally equal due to the radial components of the separate forces being equal, but applied in opposing directions, such that net radial force exerted by all the magnets 15A or 15B of each electromagnet set 28A, 28B is substantially zero. This state is illustrated in FIG. 3 by electromagnets $15A_1$ and $15A_3$ of the first electromagnet set 28A and preferably results in the rotor 12 being substantially supported or "levitated" by all the electromagnets 14 of the rotor assembly 10. Further, in the desired "steady state" arrangement, the rotor 12 is maintained separated from each electromagnet 14 by a separate radial gap $G_R$, each radial gap $G_R$ having a radial thickness $t_G$, as indicated in FIG. 3. Specifically, when the rotor central axis $A_C$ is retained generally collinear with the reference axis $A_R$, the radial gaps $G_R$ have approximately equal thicknesses $t_G$, but the gap thicknesses $t_G$ vary about the reference axis $A_R$ when the central axis $A_C$ is offset therefrom.

However, when the control 50 determines that the rotor 12 should be displaced radially with respect to the axis $A_R$ so as to be repositioned at a desired radial position/location (e.g., centered on the axis $A_R$), the control 50 adjusts the current in one or more electromagnets 14 of a particular set 28A, 28B to be either greater than or lesser than the current in the other electromagnets 14 of the same set 28A, 28B. Thereby, a greater magnetic force is exerted on the section of the rotor portion 21A or/and 21B adjacent to the electromagnet(s) 15A, 15B having greater current, such that a net radial force is exerted on the rotor 12 to displace the rotor 12 in a desired radial direction $D_{R1}$ or $D_{R2}$.

For example, if the control 50 increases current in one electromagnet 15A of the first set 28A and generally simultaneously in the axially aligned second electromagnet 15B of the second set 28B, the entire rotor 12 will displace radially in a direction $D_{R1}$ or $D_{R2}$ toward the particular first and second electromagnets 15A, 15B. However, if current is increased in a first electromagnet 15A and generally simultaneously in a second electromagnet 15B on an opposing side of the axis $A_R$, the two ends 12a, 12b of the rotor 12 displace in opposing radial directions, such that rotor 12 "tilts" back to the desired orientation (i.e., with the rotor central axis $A_C$ collinear with the reference axis $A_R$). Further, in either of these cases, if one rotor portion 23A, 23B is located more proximal to the adjacent channeling member 17A, 17B in comparison with the other rotor portion 23B, 23A, the rotor 12 will also displace axially toward the more proximal channeling member 17A, 17B when the current increases due to a greater increase in the axial component of the exerted force $f_{m1n}$ or $f_{m2n}$.

Although two sets 28A, 28B of circumferentially-spaced electromagnets 14 is presently preferred, the rotor assembly 10 may alternatively include only a single set of electromagnets 28A or 28B located generally proximal to one rotor end 12a or 12b, and may further include a mechanical or magnetic means of biasing the other rotor end 12b, 12a (e.g., spring, permanent magnet, etc.).

As best depicted in FIG. 2, the rotor assembly 10 preferably further comprises a generally cylindrical tubular body 30 having a first end 30a coupled with the first channeling member 17A and a second end 30b coupled with the second channeling member 17B, such that body 30 and channeling members 17A, 17B form a housing 31. More specifically, the tubular body 30 is preferably substantially circular and has a relatively slight wall thickness (i.e., is "thin-walled"). Further, the body 30 and the channeling members 17A, 17B define an interior "rotor" chamber $C_R$, at least a portion of the rotor 12 being disposed within the chamber $C_R$. With the one preferred embodiment of the rotor assembly 10 being an X-ray anode assembly 1, the housing 30 and channeling members 17A, 17B are configured to substantially prevent gas flow between the interior chamber $C_R$ and an exterior space $S_E$ such that the chamber $C_R$ is substantially evacuateable of gas. In other words, air can be evacuated from the rotor chamber $C_R$ to form a partial vacuum, such that the housing 31 is a substantially sealed unit for containing at least a potion of the rotor 12 in an isolated environment. However, the sealed housing 31 may alternatively be utilized to contain a quantity of gas within the chamber $C_R$ that has a pressure exceeding ambient pressure.

Furthermore, each end 30a, 30b of the tubular body 30 preferably extends about or "overlaps" a portion of the outer circumferential surface 26 of each annular member 17A, 17B, and is most preferably secured thereto by weldment material. However, the channeling members 16 and the tubular body 30 may alternatively be connected together, either fixedly or removably, by any other appropriate means (e.g., threaded fasteners, rivets, glue, press fit, etc.), the tubular body 30 may fit within a portion of each channeling member 17A, 17B, and/or the tubular body 30 and channeling members 16 may be connected by one or more separate components (e.g., spacer rings). As a further alternative, the channeling members 17A, 17B and the tubular body 30 may be provided as portions of a unitary or one-piece construction.

As best shown in FIG. 2, the rotor 12 preferably includes a generally tubular body 32 with a central bore 35 and includes a radially-larger central section 33 and two radially-smaller end sections 34A, 34B. The rotor body central section 33 is sized to fit at least generally closely within the tubular body 30 and provides the end surfaces 21A, 21B and the rotor portions 23A, 23B interacting with the electromagnets 14. Each rotor body end section 34A, 34B provides a separate one of the rotor ends 12a, 12b, respectively, and is disposed within a separate one of the annular channeling members 17A, 17B, respectively. Although the described rotor structure is presently preferred, the rotor 12 may be formed in any other appropriate manner, such as being substantially solid as opposed to tubular, having a substantially constant outside diameter as opposed to two radially inwardly-stepped end sections 33A, 33B, etc., and the present invention is in no manner limited to any particular rotor structure.

Referring now to FIGS. 1, 3 and 5, each electromagnet 14 preferably includes two core members 36, 38 spaced apart generally along the reference axis $A_R$ and two coils 40A, 40B. Each coil 40A, 40B is disposed circumferentially about a separate one of the core members 36, 38, respectively, and is connectable with a source of electric power (e.g., a battery, an electric outlet, etc.). As such, magnetic flux $M_F$ extends in a generally circuitous path through the two core members 36, 38, which are preferably spaced by magnetically permeable channeling member 42 (as described below), the proximal rotor portion 23A, 23B and the associated channeling member 17A, 17A when current flows through the two coils 38a, 38B.

More specifically, each electromagnet 14 is located with respect to the rotor 12 such that the associated rotor portion 23A or 23B is generally radially adjacent to one core member 38 and is spaced axially from the other core member 36. As such, magnetic flux $M_F$ extends at least generally radially between the one core member 38 and the adjacent rotor portion 22, specifically through a section of the tubular body 30 disposed between the particular core member 38 and the rotor portion 22, and extends generally axially, via the associated channeling member 17A or 17B, between the other core member 36 and the particular rotor portion 22. Further, the rotor 12 has an outer circumferential surface 25 extending about each rotor portion 23A, 23B and each of the two core members 36, 38 has inner radial end 36a, 38a and an outer radial end 36b, 38b. The inner end 38a of one the one core member 38 is radially adjacent to the rotor outer circumferential surface 25 and the inner end 36a of the other core member 36 is spaced axially from the rotor radial surface 20. Furthermore, each electromagnet 14 also preferably further includes a magnetically permeable channeling member 42 disposed generally between the outer radial ends 36b, 38a of the two core members 36, 38, such that magnetic flux $M_F$ passes between the core members 36, 38 through the associated magnet channeling member 42.

Although the above-described structure is presently preferred, the one or more electromagnets 14 may be formed in any other appropriate manner that is capable of enabling the rotor assembly 10 to function generally as described herein. Thus, the scope of the present invention includes all appropriate electromagnet types and electromagnet constructions for the electromagnet(s) 14 of the rotor assembly 10.

Figure 6:
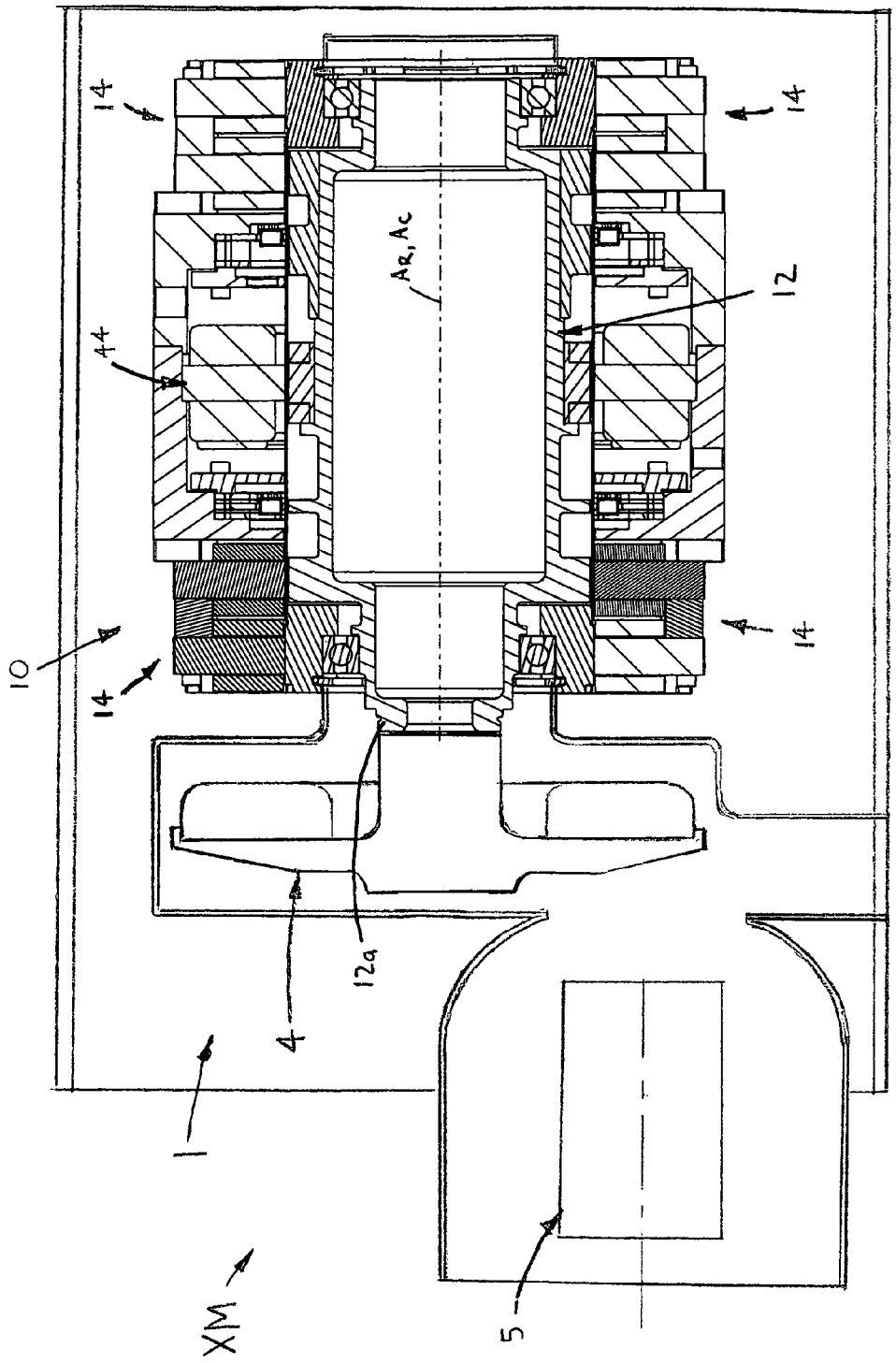
FIG. 6 is an axial cross-sectional view of the rotor assembly incorporated into an X-ray tube assembly.
Figure 7:
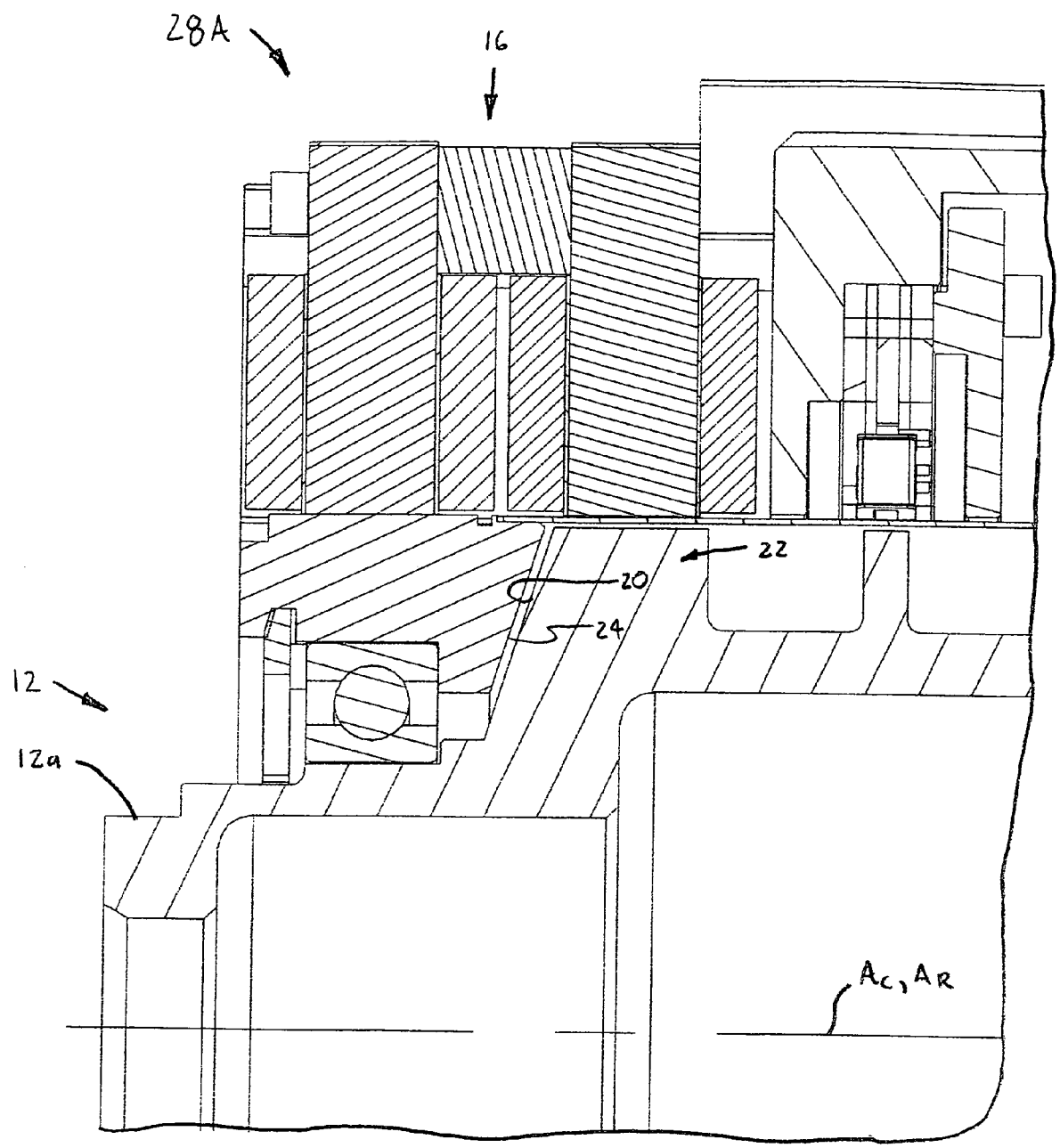
FIG. 7 is a greatly enlarged, broken-away axial cross-sectional view of an upper, front portion of the rotor assembly, showing alternative constructions of a rotor and a channeling member.

Referring to FIGS. 2, 4 and 6, the rotor assembly 10 preferably further comprises a motor 44 configured to rotatably drive or displace the rotor 12 about the reference axis $A_R$, and thus with respect the electromagnets 14, the two channeling members 16 and the housing body 30. The motor 44 preferably includes a generally annular rotor 46 disposed or mounted to the rotor 12 and a generally annular stator 48 extending circumferentially about the rotor 46 and about a section of the tubular body 30 disposed between the rotor 46 and the stator 48. Thereby, the motor 44 is able to drive the rotor 12 while the rotor 12 remains within the sealed chamber $C_R$. However, the rotor assembly 10 may be provided with any other appropriate mechanism or device for rotatably displacing the rotor 12, such as for example a motor or engine coupled to an end 12a or 12b of the rotor 12 either directly or through a transmission device (e.g., gears, belts, coupler shafts, etc).

Referring particularly to FIG. 2, as discussed above, the rotor assembly 10 preferably further comprises a control 50 configured to separately adjust electric current through each one of the plurality of electromagnets 15A, 15B so as to bias or displace the rotor 12, particularly when the rotor 12 is spaced from a desired location/position. More specifically, to displace the rotor 12 radially, the control 50 adjusts current through at least one electromagnet 14 in one of the electromagnet sets 28A, 28B so that the force exerted on the rotor 12 by the at least one electromagnet 14 is greater than or lesser than the force generated by the other electromagnets 14 of the same set 28A, 28B. Additionally or alternatively, to displace the rotor 12 axially, the control 50 adjusts current in at least one electromagnet 15A or 15B of one set 28A, 28B of electromagnets 14 so that the force exerted on the rotor 12 by the electromagnet 15A, 15B is greater or lesser than the force exerted by the other set 28B, 28A of electromagnets 14. Preferably, when it is desired to displace the rotor 12 axially, the control 50 is configured to adjust current through all of the electromagnets 15A, 15B of one set 28A or 28B of electromagnets 14 by a substantially equal amount and to be greater or lesser than the current in the electromagnets 15B, 15A of the other set of electromagnets 28B, 28A, so as to thereby prevent undesired radial displacement of the rotor 12.

Further, the rotor assembly 10 preferably also comprises at least one sensor 52 coupled with the control 50 and configured to sense a radial position $P_R$ of the rotor 12 with respect to the reference axis $A_R$ and at least one sensor 52 coupled with the control 50 and configured to sense an axial position $P_A$ of the rotor 12 with respect to the axis $A_R$. Also, the control 50 preferably further includes a value (i.e., stored in a memory, inputted, etc.) corresponding to a desired radial position $P_R$ (i.e., centered on or radially spaced from the reference axis $A_R$) of the rotor 12 and a value corresponding to a desired axial position $P_A$ of the rotor 12. With such sensors 52, the control 50 is further configured to compare the sensed radial and axial positions of the rotor 12 with desired axial and radial position values and to adjust current in the electromagnets 14 as necessary to reposition the rotor 12.

That is, the control 50 adjusts current through at least one electromagnet 15A, 15B of at least one of the first and second sets of electromagnets 28A, 28B to displace the rotor 12 in a radial direction $D_{R1}$, $D_{R2}$ when the control 50 determines a noncorrespondence between the sensed radial position and the desired radial position value $V_R$. Simultaneously or alternatively, the control 50 adjusts current through at least one electromagnet 15A, 15B of one of the first and second sets 28A, 28B of electromagnets 14 so as to displace the rotor 12 in an axial direction $D_{A1}$, $D_{A2}$ when the control 50 determines a noncorrespondence between the sensed axial position and the desired axial position value $V_A$. It must be noted that such desired position values $V_A$, $V_R$ may be "permanently" stored in a memory of the control 50 or may vary in accordance with a control program or external input. Further, the rotor assembly 10 most preferably includes a first sensor assembly 53A configured to sense both radial and axial position of the rotor 12 and a second sensor assembly 53A configured to sense both rotor radial position and rotational speed of the rotor 12. However, as is readily apparent to one skilled in the art of sensors and magnetic bearings, there are many possible arrangements of sensors for determining the radial and axial position, and rotational speed, of the rotor 12, and the scope of the present invention is in no manner limited to any particular sensor structure or arrangement.

Referring particularly to FIG. 6, in the preferred application of an X-ray anode assembly 1 for an X-ray machine XM, the rotor assembly 10 is preferably configured to receive an anode, as discussed above, and the anode assembly 1 further comprises an X-ray anode 4 mounted to one end 12a of the rotor 12. As the motor 44 rotatably drives the rotor 12, the anode 4 is angularly displaced with respect to an X-ray cathode 5. As X-ray machines are generally known, a detailed description of the anode 4, cathode 5 and other components of such an X-ray machine are beyond the scope of the present disclosure.

However, the benefits of the present rotor assembly 10 to such an X-ray machine XM must be noted. Specifically, by having the two annular channeling members 16 located with respect to opposing radial end surfaces 20 of the rotor 12 and radially inwardly of the electromagnets 14, the electromagnets 14 are capable of biasing the rotor 12 both radially and axially due to the above-described path of the magnetic flux $M_F$ through the portion(s) 22 of the rotor 12 and the channeling members 16. Such a magnetic actuator structure eliminates the need for one or more radially-outwardly extending rotor flanges or angled rotor sections that would otherwise be required in order to provide an axial bias on the rotor 12, which permits the rotor 12 to have a substantially circular cylindrical or tubular shape that is disposeable within the circular cylindrical tubular body 30. Not only is such a straight-walled tubular body 30 relatively simple and cost effective to manufacture in comparison to the housings required to encapsulate a rotor with flanges or with angled sections (e.g., a housing with conical sections), a sealable housing 31 is readily and relatively inexpensively formed by attaching the ends 30a, 30b of the tubular body 30 to the preferred pair of channeling members 16. These and other benefits will be readily apparent to those skilled in the art of magnetic bearings and devices incorporating such bearings.

Furthermore, it must also be noted that the utilization of the rotor assembly 10 in an X-ray anode assembly 1 is only one presently preferred application of the rotor assembly 10. As such, the rotor assembly 10 may be used in any other appropriate application, particularly applications in which a sealed environment is desirable, and the scope of the present invention is in no manner limited to any particular application of the rotor assembly 10.

Figure 8:
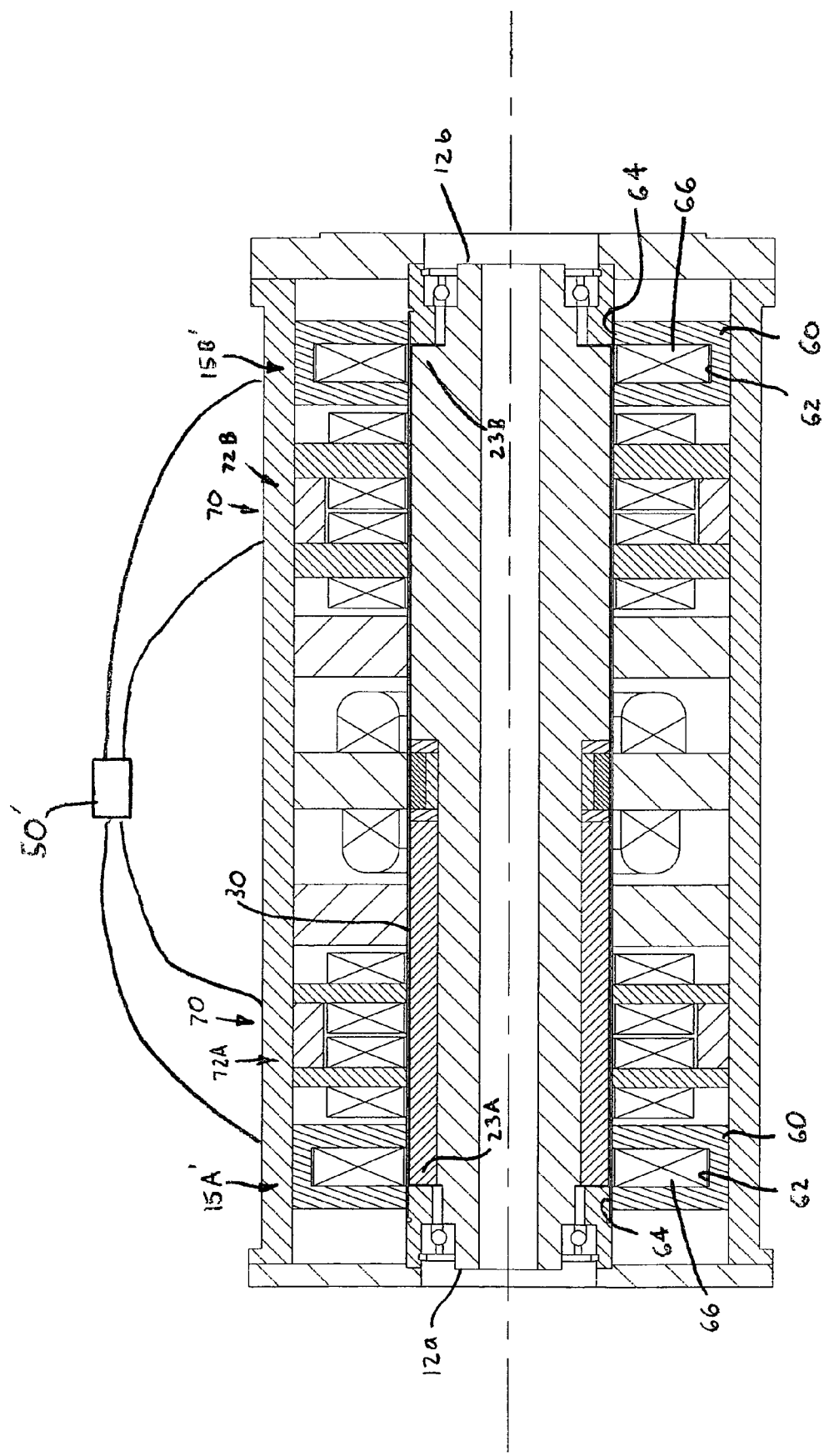
FIG. 8 is an axial cross-sectional view of an alternative construction of the rotor assembly having separate radial actuators.

Referring particularly to FIG. 8, an alternative construction of the rotor assembly 10 is generally similar to the preferred construction described in detail above, but with the following differences. Instead of a plurality of separate first and second magnets 15A, 15B adjacent to each rotor portion 23A, 23B, the alternative construction includes only one first electromagnet 15A' and one second electromagnet 15B'. Each electromagnet 15A', 15B' includes an annular core member 60 extending circumferentially about the rotor 12, and preferably externally about the tubular body 30, with an annular groove 62 extending radially outwardly from an inner circumferential surface 64, and an annular coil 66 disposed within the groove 62. With this structure, each electromagnet 15A', 15B' exerts magnetic force about the entire circumference of the associated rotor portion 23A, 23B, such that radial components of the force exerted about the circumference are cancelling, and thus the electromagnets 15A', 15B' each only exert a net axial biasing force, when the rotor 12 is substantially centered within the electromagnets 15A', 15B'. As such, the alternative construction of the rotor assembly 10 preferably includes separate radial magnetic bearing actuators 70, most preferably two sets of electromagnets 72A, 72B constructed substantially similarly to the first and second electromagnet sets 28A, 28B as described in detail above, except for being spaced axially inwardly from the rotor portions 23A, 23B. In use, the control 50' adjusts current through the first and second electromagnets 15A', 15B' to adjust the axial position of the rotor 12 and/or adjusts current through the electromagnets 70A, 70B to adjust the radial position of the rotor 12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A rotor assembly comprising:
   a rotor having opposing first and second ends, a central axis extending generally between the two ends, the central axis being one of collinear with and generally parallel to a reference axis, and a radial surface, the rotor being rotatable about the central axis;
   at least one electromagnet disposed proximal to and configured to exert magnetic force on a portion of the rotor; and
   a channeling member disposed generally adjacent to the electromagnet and having a radial surface disposed generally adjacent to the rotor radial surface such that magnetic flux generated by the electromagnet extends generally radially between the electromagnet and the rotor portion and generally axially between the rotor portion and the channeling member so that the magnetic force biases the rotor both radially and axially with respect to the reference axis to maintain the rotor at a desired position with respect to the reference axis;
   wherein the at least one electromagnet includes two core members spaced apart generally along the reference axis and two coils, each coil being disposed circumferentially about the core member and connectable with a source of electric power such that magnetic flux extends in a generally circuitous path through the two core members, the rotor portion and the channeling member when current flows through the two coils.

2. The rotor assembly as recited in claim 1 wherein the at least one electromagnet includes a plurality of electromagnets spaced circumferentially about the reference axis, each one of the plurality of electromagnets being configured to exert magnetic force on the rotor portion, the channeling member being disposed generally against each one of the plurality of electromagnets.

3. The rotor assembly as recited in claim 2 wherein the channeling member is generally annular and has an outer circumferential surface, each of the plurality of magnets being disposed generally against the channeling member outer circumferential surface.

4. The rotor assembly as recited in claim 3 wherein the channeling member includes one of a generally annular body and a plurality of connected segments.

5. The rotor assembly as recited in claim 2 further comprising a control configured to separately adjust electric current through each one of the plurality of electromagnets.

6. The rotor assembly as recited in claim 5 wherein the rotor is displaceable in a radial direction with respect to the reference axis when the control adjusts current through at least one of the plurality of electromagnets such that the force exerted by the at least one electromagnet on the rotor portion is one of greater than and lesser than the force exerted by at least one of the other electromagnets on the rotor portion.

7. The rotor assembly as recited in claim 1 wherein:
the at least one electromagnet is a first electromagnet, the channeling member is a first channeling member, the rotor portion is a first rotor portion, and the rotor radial surface is a first radial surface, the rotor further including a second surface section spaced axially from the first surface section; and
the rotor assembly further comprises a second electromagnet spaced axially from the first electromagnet and a second channeling member spaced axially from the first channeling member and disposed against the second electromagnet, the second electromagnet being configured to exert magnetic force on a second portion of the rotor, the second channeling member having a radial surface section disposed generally adjacent to the rotor second radial surface section such that magnetic flux generated by the second electromagnet extends generally radially between the second electromagnet and the other rotor portion and generally axially between the rotor portion and the channeling member so that the magnetic force exerted by the second electromagnet biases the rotor both radially and axially with respect to the reference axis.

8. The rotor assembly as recited in claim 1 wherein the channeling member is generally annular, is spaced radially inwardly from the electromagnet assembly, and has a central bore, the rotor extending at least partially through the bore.

9. The rotor assembly as recited in claim 8 further comprising an auxiliary bearing disposed within the channeling member and about the rotor, the auxiliary bearing being configured to at least rotatably support the rotor.

10. The rotor assembly as recited in claim 1 wherein the at least one electromagnet is located with respect to the rotor such that the rotor portion is generally radially adjacent to one of the two core members of the electromagnet and is spaced axially from the other one of the core members such that magnetic flux extends at least generally radially between the one core member and the rotor portion and extends generally axially between the other core member and the rotor portion.

11. The rotor assembly as recited in claim 10 wherein the rotor has an outer circumferential surface extending about the rotor portion, each of the two core members has inner and outer radial ends, the inner end of one of the two core members being radially adjacent to the rotor outer circumferential surface and the inner end of the other one of the core members is spaced axially from the rotor radial surface.

12. A magnetic bearing assembly for a rotor assembly, the rotor assembly including a rotor having opposing first and second ends, a central axis extending generally between the two ends and generally parallel to a reference axis, and a radial surface, the rotor being rotatable about the central axis, the magnetic bearing assembly comprising:
at least one electromagnet disposed proximal to and configured to exert magnetic force on a portion of the rotor;
a channeling member disposed generally against the electromagnet and having a radial surface disposed generally adjacent to the rotor radial surface such that magnetic flux generated by the electromagnet extends generally radially between the electromagnet and the rotor portion and generally axially between the rotor portion and the channeling member so that the magnetic force biases the rotor both radially and axially with respect to the reference axis to maintain the rotor generally centered about the reference axis, wherein the channeling member is generally annular, is disposed radially inwardly from the at least one electromagnet, and has a central bore configured to receive the rotor at least partially therein; and
an auxiliary bearing disposed within the channeling member and configured to surround the rotor so as to at least rotatably support the rotor.

13. A rotor assembly comprising:
a rotor having opposing first and second ends, a central axis extending generally between the two ends and generally parallel to a reference axis, and first and second radial surfaces, the rotor being rotatable about the central axis;
first and second electromagnets spaced apart along the reference axis, the first electromagnet being disposed proximal to and configured to exert magnetic force on a first portion of the rotor so as to bias the rotor first portion radially and axially with respect to the reference axis, the second electromagnet being disposed proximal to and configured to exert magnetic force on a second portion of the rotor so as to bias the rotor second portion both radially and axially with respect to the reference axis;
first and second generally annular channeling members spaced apart along the reference axis, the first channeling member being disposed generally against the first electromagnet and having a radial surface disposed generally adjacent to the rotor first radial surface and the second channeling member being disposed generally against the second electromagnet and having a radial surface disposed generally adjacent to the rotor second radial surface; and
a generally cylindrical tubular housing having a first end disposed against the first channeling member and a second end disposed against the second channeling member, the housing and the channeling members defining at least a portion of a sealable chamber, at least a portion of the rotor being disposed within the sealable chamber, and the first and second electromagnets being disposed radially outward of the tubular housing and exterior to the sealable chamber.

14. The rotor assembly according to claim 13, wherein the first channeling member is immovably connected to the first end of the tubular housing and the second channeling member is immovably connected to the second end of the tubular housing.

15. The rotor assembly according to claim 14, wherein:
the first and second channeling member are each at least generally annular and each have an outer circumferential surface and
at least a portion of the tubular housing radially overlaps the outer circumferential surface of each of the first and second channeling members.

16. The rotor assembly according to claim 14, wherein:
the first and second channeling members each have a radial thickness that is greater than a radial thickness of the tubular housing and
at least one core member of each of the first and second electromagnets is separate from, and disposed radially outwardly of, the first and second channeling members, respectively.

17. The rotor assembly as recited in claim 13 further comprising a motor configured to rotatably drive the rotor about the rotor axis and including:
a generally annular rotor disposed on or mounted to the rotor and
a generally annular stator extending circumferentially about the rotor and about a section of the tubular body that is disposed between the rotor and the stator.

18. A rotor assembly comprising:
a rotor having opposing first and second ends, a central axis extending generally between the two ends, the central axis being one of collinear with and generally parallel to a reference axis, and a first radial surface axially spaced from a second radial surface, the rotor being rotatable about the central axis;
a first set of electromagnets disposed proximal to and configured to exert magnetic force on a first portion of the rotor,
a second set of electromagnets disposed proximal to and configured to exert magnetic force on a second portion of the rotor, each of the first and second sets of electromagnets including a plurality of electromagnets spaced circumferentially about the reference axis, each one of the plurality of electromagnets being configured to exert magnetic force on the respective first and second rotor portions;
a first channeling member disposed generally adjacent to, and against each one of the plurality of electromagnets of, the first set of electromagnets and having a first radial surface disposed generally adjacent to the rotor first radial surface such that magnetic flux generated by the first set of electromagnets extends generally radially between the first set of electromagnets and the first rotor portion and generally axially between the first rotor portion and the first channeling member so that the magnetic force biases the rotor both radially and axially with respect to the reference axis to maintain the rotor at a desired position with respect to the reference axis;
a second channeling member disposed generally adjacent to, and against each one of the plurality of electromagnets of, the second set of electromagnets and having a second radial surface disposed generally adjacent to the rotor second radial surface such that magnetic flux generated by the second set of electromagnets extends generally radially between the second set of electromagnets and the second rotor portion and generally axially between the second rotor portion and the second channeling member so that the magnetic force biases the rotor both radially and axially with respect to the reference axis to maintain the rotor at a desired position with respect to the reference axis; and
a control configured to separately adjust electric current through each of the plurality of electromagnets of each of the first and second sets of electromagnets such that the rotor is displaceable in an axial direction with respect to the reference axis when the control adjusts current through at least one electromagnet of one of the first and second sets of electromagnets such that the force exerted on the rotor by the at least one electromagnet is either greater than or lesser than the force exerted on the rotor by each electromagnet of the other one of the first and second sets of electromagnets.

19. The rotor assembly as recited in claim 18 wherein:
the control is configured to adjust current through all of the electromagnets of one of the first and second sets of electromagnets such that the force exerted on the rotor by each electromagnet is substantially equal to the force exerted on the rotor by each one of the other electromagnets of the set and is either greater than or lesser than the force exerted on the rotor by the electromagnets of the other one of the first and second sets of electromagnets so as to displace the rotor generally along the axis; and
the control is configured to adjust current through one of the electromagnets of at least one of the first and second sets of electromagnets such that the force exerted on the rotor by the one electromagnet is either greater than or lesser than the force exerted on the rotor by each one of the other electromagnets of the at least one set of electromagnets so as to displace the rotor generally radially with respect to the rotor axis.

20. The rotor assembly as recited in claim 19 further comprising a sensor coupled with the control and configured to sense at least one of an axial position of the rotor with respect to the reference axis and a radial position of the rotor with respect to the reference axis.

21. The rotor assembly as recited in claim 20 wherein:
the control includes a value corresponding to a desired axial position of the rotor and a value corresponding to a desired radial position of the rotor;
the control is further configured to compare a sensed axial position of the rotor with the desired axial position value and to adjust the current through at least one electromagnet of one of the first and second sets of electromagnets to displace the rotor in an axial direction when the control determines a non-correspondence between the sensed axial position and the desired axial position value; and
the control is further configured to compare a sensed radial position of the rotor with the desired radial position value and to adjust the current through at least one electromagnet of at least one of the first and second sets of electromagnets so as to displace the rotor in a radial direction when the control determines a non-correspondence between the sensed radial position and the desired radial position value.

22. The rotor assembly as recited in claim 18 wherein each of the first and second channeling members is generally annular and the rotor assembly further comprises a generally cylindrical tubular housing extending generally along the rotor axis and having a first end disposed against the first channeling member and a second end disposed against the second channeling member, the housing and the channeling members defining an interior chamber, the rotor being at least partially disposed within the interior chamber.

23. The rotor assembly as recited in claim 22 wherein the housing and channeling members are configured to at least substantially prevent gas flow between the interior chamber and an exterior space.

24. The rotor assembly as recited in claim 23 further comprising an X-ray anode coupled with one of the first and second ends of the rotor.

25. The rotor assembly as recited in claim 18 wherein each of the first and second sets of electromagnets includes two core members spaced apart generally along the reference axis and two coils, each coil being disposed circumferentially about the core member and connectable with a source of electric power such that magnetic flux extends in a generally circuitous path through the two core members, the rotor portion and the channeling member when current flows through the two coils.

* * * * *